Figure 4:
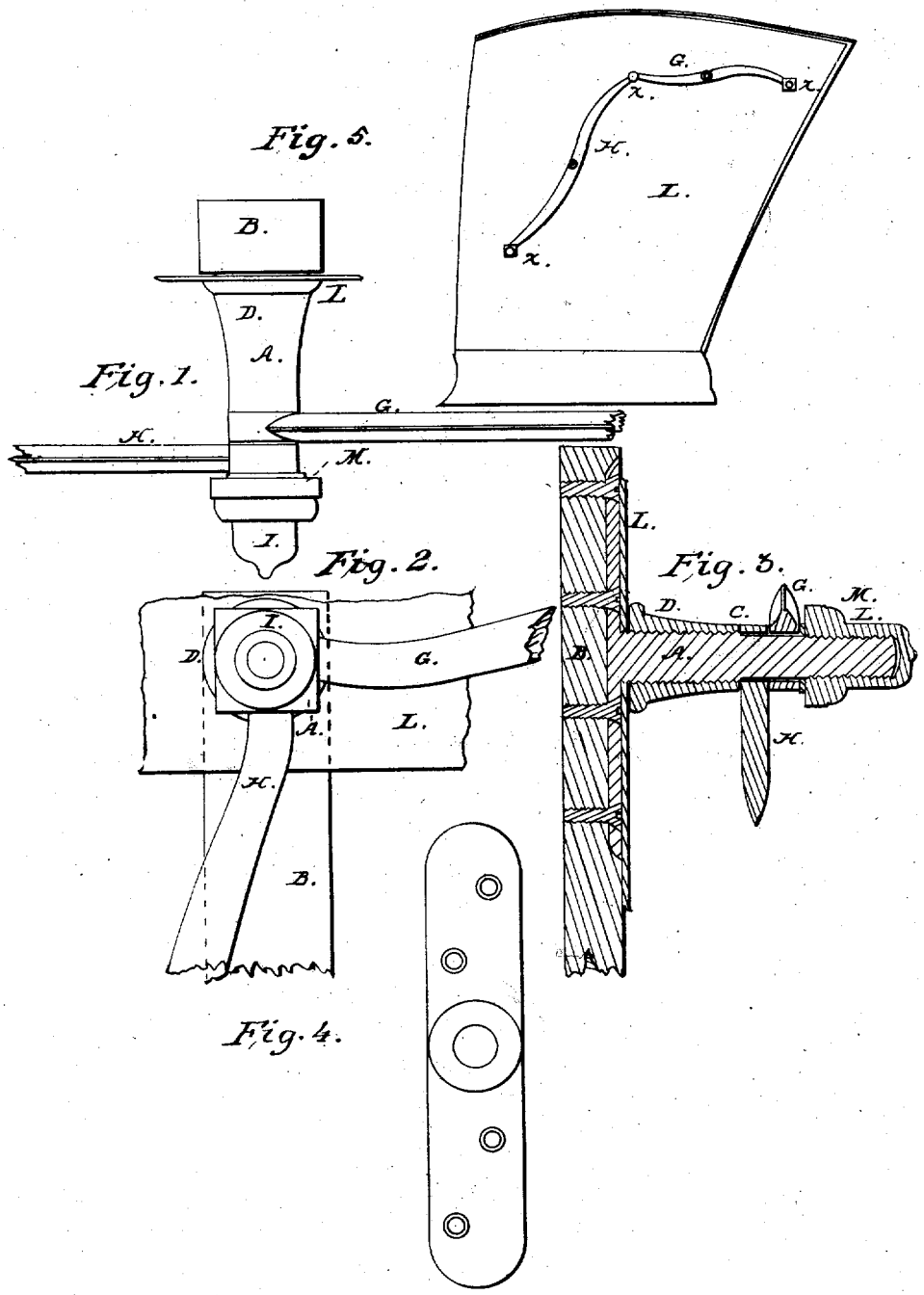

C. THOMAS.

Carriage-Top.

No. 1,331. Reissued Aug. 26, 1862.

N. PEIERS, PHOTO-LITHOGRAPHER, WASHINGTON, D. C.

UNITED STATES PATENT OFFICE.

CHAUNCEY THOMAS AND DANIEL P. NICHOLS, OF ROXBURY, MASSACHUSETTS, ASSIGNEES OF CHAUNCEY THOMAS, AFORESAID.

IMPROVEMENT IN CARRIAGE-PROPS.

Specification forming part of Letters Patent No. 18,254, dated September 22, 1857; Reissue No. 1,331, dated August 26, 1862.

*To all whom it may concern:*

Be it known that we, CHAUNCEY THOMAS and DANIEL P. NICHOLS, of Roxbury, in the county of Norfolk and State of Massachusetts, do hereby declare that CHAUNCEY THOMAS aforesaid did obtain Letters Patent of the United States for an Improved Carriage-Prop, said Letters Patent bearing date September 22, 1857, a portion of which were assigned to DANIEL P. NICHOLS, and duly recorded in the Patent Office, and therefore we, CHAUNCEY THOMAS and DANIEL P. NICHOLS, the parties aforesaid, for the purpose of obtaining a reissue, do hereby declare that the following is a full, clear, and exact description of the same, reference being had to the accompanying drawings, making a part of this specification, in which—

Figure 1 is a top view of the said prop and portions of two joint-bars, as applied to a part of a carriage-bow. Fig. 2 is a side view of the same. Fig. 3 is a section taken through the axis of the prop and passing longitudinally through the portion of the bow to which it is attached. Fig. 4 is a side view of a carriage-prop of the ordinary construction, which consists of a joint-pin, *a*, projecting from a plate, *b*, which, when in use, is placed against the outer surface of the leather covering of a carriage or gig, and is confined to the bow by screws passing through the said plate and the leather covering and into the bow. Fig. 5 is a side view of a gig-top, and represents the hinged joint-bars G H and their props *x x x*.

Similar letters of reference indicate corresponding parts in the several figures.

In carrying out this improvement a joint-bar standard, A, is employed, formed as shown in side view in Fig. 2, it being screwed or fastened directly to the bow B, as shown in Fig. 3. This standard A is provided with a male screw, C, which is furnished with a screw-cap or tapering nut, D, that screws upon it, as shown in Fig. 3, such nut at its base resting directly on the leather of the carriage-hood, this leather being represented at L. The tapering screw nut or cap, besides forming a finish to the prop, serves to confine the leather to the bow, and also serves as a shoulder for one of the joint-bars G H to rest against. These joint-bars turn freely on the standard A, and are maintained in place by a nut, I, which is screwed upon the end of the standard and against a washer, M, arranged between the said nut and the adjacent joint-bar.

Before placing the leather of the carriage-hood on the prop such leather should have a round hole cut through it of a sufficient size to receive that part of the standard on which the screw shoulder-cap or tapering nut D is to be arranged.

The advantages of my improved prop over the common carriage-prop consist in its being directly applied against and fastened to the carriage-bow, and not by screws extending through the leather of the hood and into the bow, my improved prop, by means of its peculiar construction and mode of application, enabling a wrinkle to be easily removed from the leather whenever such may be caused either by expansion or contraction of the same.

With the common prop the wrinkle must remain in consequence of the manner in which the said prop is arranged with respect to the leather and the bow and secured in place.

Although it would, perhaps, be preferable to have the shoulder-cap D provided with an internal screw-thread to screw on the joint-bar standard A, as described, still said shoulder-cap may be fitted loosely on said standard and pressed snugly against the leather L, or retained in proper position by the nut I and washer M, between which and the standard A the joint-bars G H are fitted on standard A.

What we claim as new, and desire to secure by Letters Patent, is—

The improved carriage prop as constructed with a screw or a loose shoulder-cap, D, combined with a joint-bar standard, A, and arranged between the leather L and the joint-bars G H, all placed on the standard, or the latter passing through them and secured in position by the nut I, substantially as described.

CHAUNCEY THOMAS.
DANIEL P. NICHOLS.

Witnesses:

THOMAS B. SMITH,
DAVID SIMPSON.